United States Patent [19]

Nakatsuji

[11] Patent Number: 4,930,384

[45] Date of Patent: Jun. 5, 1990

[54] DIE FOR NOTCHING HOLLOW TUBING

[75] Inventor: Sanji Nakatsuji, Oiso, Japan

[73] Assignee: Sanko Industries Limited, Kanagawa, Japan

[21] Appl. No.: 314,486

[22] Filed: Feb. 23, 1989

[30] Foreign Application Priority Data

Feb. 24, 1988 [JP] Japan .................................. 63-41297

[51] Int. Cl.⁵ .............................................. B26D 3/14
[52] U.S. Cl. .......................................... 83/54; 83/692; 83/917; 83/689; 72/325
[58] Field of Search .................... 83/54, 689, 917, 620, 83/688, 636, 692; 72/325

[56] References Cited

U.S. PATENT DOCUMENTS

| 1,513,100 | 10/1924 | Frederick | 83/917 |
| 2,423,601 | 7/1947 | MacArthur | 83/689 |
| 3,119,296 | 1/1964 | Foster | 83/54 |
| 3,721,144 | 3/1973 | Yamamori | 83/689 |

FOREIGN PATENT DOCUMENTS

| 348263 | 9/1972 | U.S.S.R. | 83/54 |
| 388817 | 7/1973 | U.S.S.R. | 72/325 |
| 470338 | 5/1975 | U.S.S.R. | 72/325 |
| 537739 | 12/1976 | U.S.S.R. | 72/325 |

Primary Examiner—Daniel C. Crane
Attorney, Agent, or Firm—Wood, Phillips, Mason, Recktenwald & VanSanten

[57] ABSTRACT

A die for making an incision in a workpiece by forcibly advancing the die in a linear path against a workpiece. The die consists of a body with leading and trailing ends and a cutting blade on the leading end of the body, which cutting blade has first and second spaced, wedge-shaped projections, each having an apex at its leading end, and a cutting edge between the projections and spaced in a trailing direction from the apexes of the projections.

27 Claims, 3 Drawing Sheets

DIE FOR NOTCHING HOLLOW TUBING

BACKGROUND OF THE INVENTION

1. Field of the Invention

This invention relates to metal tubing of the type commonly used to form furniture, and the like, and, more particularly, to a die for forming discrete notches/cut-outs in the tubing.

2. Background Art

It is known to provide discrete notches in hollow tubing to facilitate interconnection of tubing pieces. This construction technique is commonly employed in fabricating furniture such as desks, stands, and the like One problem that metal fabricators have contended with is that of forming the notches/cut-outs without appreciably deforming the tubular stock. This problem can be obviated by cutting or grinding the notches/cut-outs from the tubular stock, however such procedures are time consuming, expensive, imprecise, and thus impractical.

Ideally, the notches are made using a press setup through which a notch can be simply formed by a single stroke of a ram on the press. To avoid collapse of the tubing on a press setup, a female core die is generally inserted in the hollow of the tube. A male die is then directed through the tubing and is backed by the female die.

There are several drawbacks with systems utilizing a core die. First, the internal cross section of tubular stock is not uniform. Dimensions may vary from one manufacturer to the next. Further, the stock from one fabricator is commonly non-uniform. Frequently, burrs and welds project into the hollow and thereby impede or prevent the insertion of a female core die. Also, long workpieces do not lend themselves to the use of core dies.

Further, the female die, under extreme pressure, may be damaged in the forming process. In the event that the tube is deformed with the core die in place, it may be difficult or impossible to remove the core die after the notch/cut-out is formed.

A further drawback with the core dies is that they are complicated to use. One must stock core dies for all different tube configurations. Further, the insertion of the die is a meticulous process that is time consuming and results in an overall increase in manufacturing costs.

Another problem with conventional press setups is that they generally utilize a male die that has a substantial surface area which contacts the tube stock at the initiation of the press operation. The result is that the cutting die is severely stressed, thereby making it prone to failure and shortening its useful life. Further, the large surface area on the press forcibly advanced against the tubing may result in spring back or explosion thereof, the danger of which is apparent.

The present invention is specifically directed to overcoming the above-enumerated problems in a novel and simple manner.

SUMMARY OF THE INVENTION

It is the principal objective of the present invention to permit press forming of discrete notches/cut-outs in hollow tubing stock without the need for a core die.

Another object of the invention is to configure the cutting die so that it is not damaged in normal operation and will have a long life.

A further object of the invention is to prevent any significant reaction, i.e. kickback of the die from the workpiece, upon the notch/cut-out being made.

More particularly, the invention is a die for making an incision in a workpiece by forcibly advancing the die in a linear path against the workpiece. The die consists of a body with leading and trailing ends and a cutting blade on the leading end of the body. The cutting blade has first and second spaced, wedge-shaped projections, each having an apex at its leading end, and a cutting edge between the projections and spaced in a trailing direction from the apexes of the projections.

Only the apexes on the projections initially penetrate the workpiece wall at discrete locations thereon. To facilitate smooth entry of the projections into a workpiece, two angled cutting edges are provided on each projection to define a sharp corner at the projection apex.

Preferably, the projections have transverse walls which make an L-shaped incisions in the workpiece wall as the die penetrates. The result is that the corners of the unsupported upper wall of the tubing are cleanly cut.

It is also an object of the invention to progressively cut the tubing by wedging the die cutting edges against the tubing. This minimizes the necessary pressure on the die so as to minimize damage to the die and workpiece.

To accomplish this, a U-shaped cutting edge is provided between the projections. The U-shaped cutting edge progressively severs between the discrete openings made by the projections as the die advances.

A concave surface opening in a leading direction is provided on the die to deform the severed portion of the workpiece in a predetermined fashion as the die is advanced.

The inventive die has particular utility in cutting notches in square tubing stock having first and second facing wall pairs. The workpiece is aligned so that one of the flat walls is perpendicular to the line of advancement of the cutting die. Upon the cutting die being advanced, the projections penetrate the one wall of the one wall pair and form two discrete incisions therein. Further advancing of the die severs the wall between the discrete incisions and cuts a flap out of the one wall. The advancing die folds the flap away from one of the walls on the other wall pair. Further advancement causes the die to cut the other wall on the other wall pair and eventually the projections penetrate the other wall in the one wall pair to provide third and fourth discrete incisions therein. Continued advancement of the die causes the die to sever the other wall in the one wall pair between the third and fourth discrete incisions and ultimately the flap is completely separated from the workpiece.

Precision notching with a press can be accomplished according to the invention without damage to dies or workpieces. Because a press is utilized, the notching process can be simply and rapidly completed. The result is increased productivity with lower manufacturing costs.

DETAILED DESCRIPTION OF THE DRAWINGS

Figure 5:
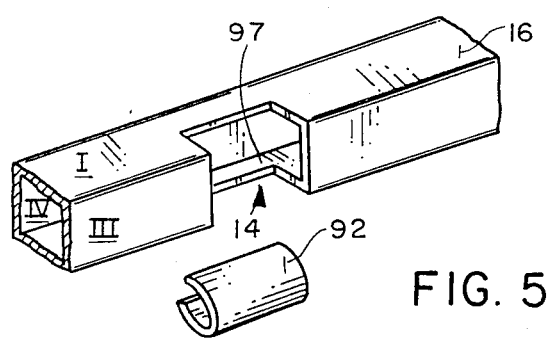
FIG. 5 is a perspective view as in FIG. 4 with a completed notch/cut-out.
Figures 6, 7:
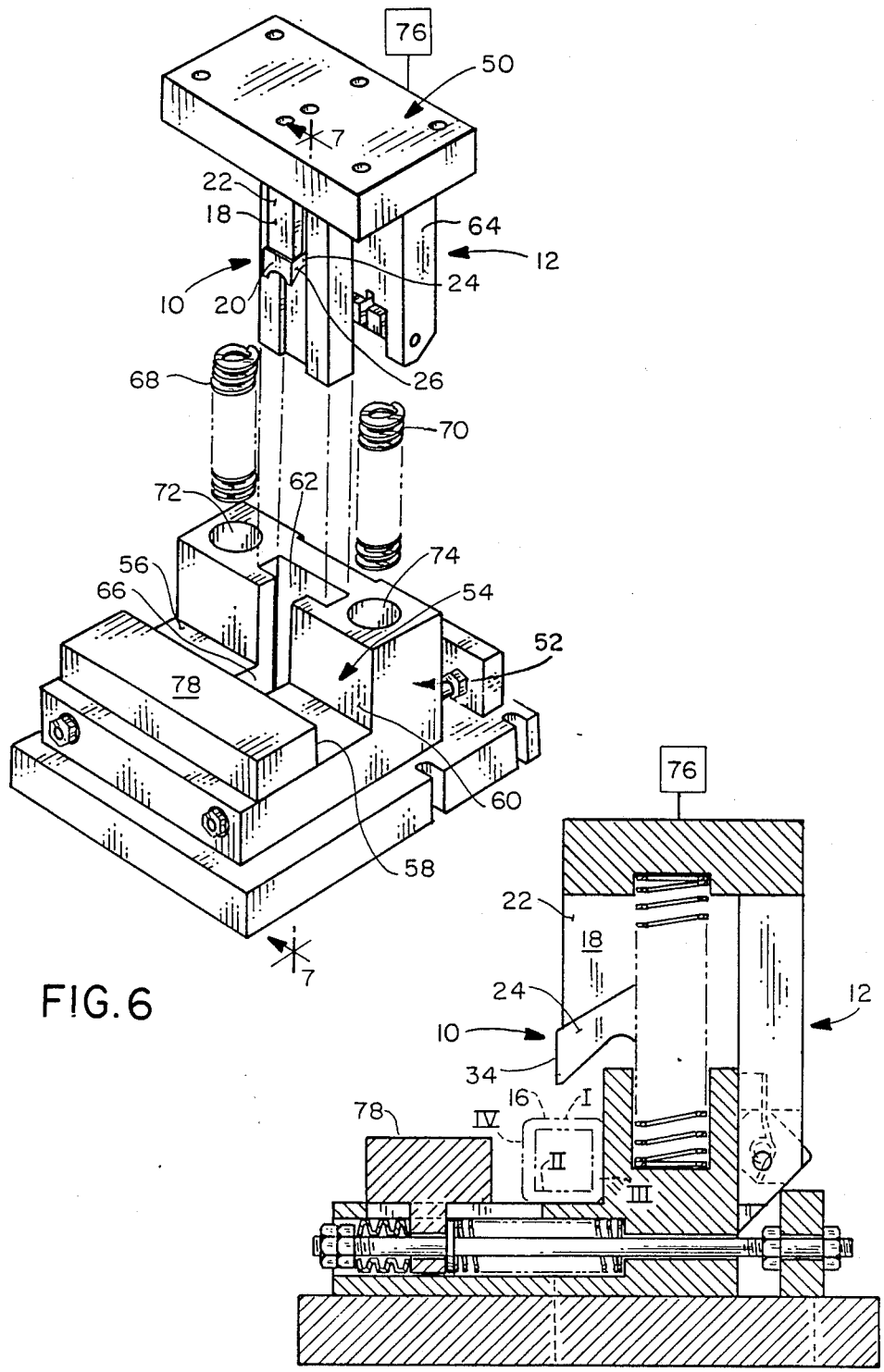
FIG. 6 is a perspective view of a press setup with the die in FIGS. 1 and 2 operatively attached.
FIG. 7 is a cross-sectional view of the press setup taken along line 7—7 of FIG. 6 with the cutting die in a retracted position.
Figure 8:
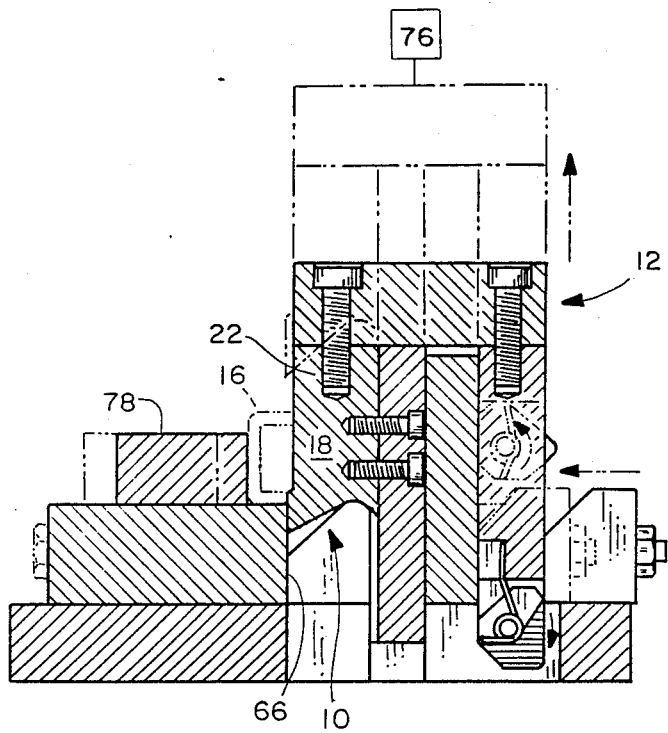
FIG. 8 is a view as in FIG. 7 with the cutting die in a fully advanced position.

A cutting die according to the present invention is shown in FIGS. 1, 2 and 6-9 at 10. The cutting die 10 is part of a press assembly at 12 in FIGS. 6-8. The cutting die 10 is used to form a notch/cut-out, as shown at 14 in FIG. 5, in a hollow workpiece 16. The cutting die 10 consists of a body 18 having a leading end 20 and a trailing end 22. The cutting die 10 is mounted on the press 12 so that the leading die end 20 projects downwardly.

A cutting blade 24 is provided on the leading end 20 of the die 10. The cutting blade 24 has spaced, wedge-shaped projections 26, 28 formed thereon. The projection 26 has an apex 30 and the projection 28 an apex 32 arranged to initially contact the workpiece 16 as the die 10 is advanced in operation.

The projections 26, 28 are configured the same and thus representative projection 26 will be described herein. The projection 26 is defined by a flat front wall 34, a flat side wall 36 and a flat rear wall 38. The front and side walls 34, 36, respectively, are arranged at right angles with respect to each other. The rear wall 38 makes an angle $\theta 1$ with a line perpendicular to the line of advancement of the die 10, which line is generally parallel to the plane of the front wall 34. The angle $\theta 1$ is approximately 30°-45° and preferably 45°. The juncture of the side and rear walls 36, 38 respectively, defines a straight cutting edge 40.

A straight cutting edge 42 projects away from the apex 30 and makes an angle $\theta 2$ with a plane perpendicular to the advancing line of the die 10. $\theta 2$ is preferably between 0°-1°. A similar cutting edge 43 projects away from the apex 30 at the side of the cutting die 10 and makes an angle $\theta 3$ with a line perpendicular to the line of advancement of the die 10 and intersecting the apex 30. The angle $\theta 3$ is preferably on the order of 10°-20°.

Figure 9:
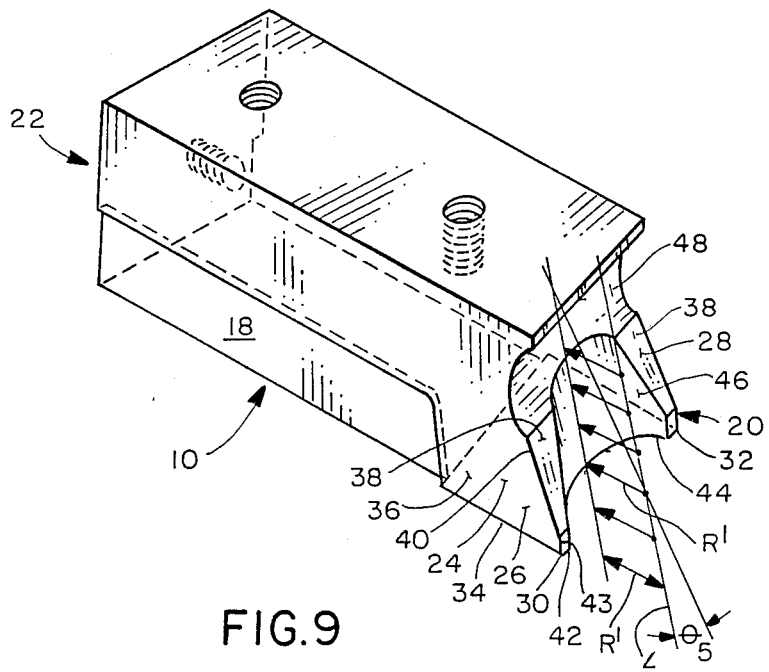
FIG. 9 is an enlarged perspective view of a modified form of the inventive cutting die.

A U-shaped cutting edge 44 is provided between the projections 26, 28. The wall 38, which is substantially flat, is cut out rearwardly of the cutting edge 44 so as to provide a concave portion 46, the purpose of which will be described hereafter. The cutting edge 44 is defined by an arc of a circle centered on point $C^1$ (See FIG. 1) with a radius R. The concave portion 46 is preferably traced by circular arcs with centers along a line L, as shown in FIG. 9. Each arc, with the exception of that defining edge 44, has a radius $R^1$. The line L makes an angle $\theta 5$ with the plane of the wall 38. Exemplary dimensions for the parts of the cutting blade are as follows:

Width of body 18 (W—FIG. 9)=1 inch;
Depth of body 18 (D—FIG. 9)=1.2 inches;
Length of edge 43=0.0078-0.195 inches;
Length of edge 44=0.0663-0.195 inches;
Radius R, defining edge 44=0.429 inch;
Center $C^1$ is 0.117 inch down from $L^2$ in FIG. 1 and spaced forwardly of wall 34 so as to makes an angle of 5° with the plane of wall 34;
$R^1$=0.4485 inch; and
$\theta 5$=15° with $\theta 1$=45°

Rearwardly of the portion 46 is a concave wall 48 opening in a leading direction. The wall 48, in cross section, is defined by the arc of a circle with a radius $R^2$ centered on $C^2$. $R^2$ is preferably equal to approximate 0.39 inch with the exemplary dimensions set forth above. The rear wall 38 is approximately tangent to the arc of wall 48 in FIG. 1 whereas in FIG. 9, the plane of wall 38 is closer to the center of the arc defining wall 48.

The die 10 is removably attached to a ram assembly 50 on the press 12. A bed at 52 defines a receptacle 54 for the workpiece 16. The workpiece 16 rests against an upwardly facing surface 56 on the bed 52 and is maintained between facing surfaces 58, 60 on the bed in a predetermined orientation. The bed 52 defines a guide slot 62 for a male guide member 64 on the ram assembly 50. The member 64 is guided in a vertical path relative to the bed 52 between a retracted position, shown in FIG. 7, and a fully advanced position, shown in FIG. 8. In the advanced position in FIG. 8, the die 10 projects into an opening 66 in the surface 56 underlying the workpiece 16. Two coil springs 68, 70 received in seats 72, 74, respectively on the bed 52, bear against the ram assembly 50 and bias the ram assembly 50 towards the retracted position of FIG. 7. The bias force of coil springs 68 and 70 is overcome by a drive mechanism, shown schematically at 76, for forcing the ram 50 into the advanced position of FIG. 8.

The workpiece 16 is square in cross section. However, the invention is not limited to either hollow workpieces or the depicted square configuration therefor. The square workpiece 16 is used herein for purposes of explanation. The workpiece 16 has facing wall pairs I, II and III, IV.

To perform a notching/cutting operation, the workpiece 16 is placed on the bed 52 against the bottom surface 56 thereof and against the forwardly facing surface 60. A movable jaw 78 is shifted from the FIG. 7 position against the workpiece 16 to maintain the workpiece fixedly in place, as in a vise. The die 10 is dimensioned so that the front face 34 of the cutting blade 24 is located approximately midway between the workpiece walls III, IV.

By operating the drive 76, the ram assembly 50 and die 10 are advanced downwardly, thereby bringing the apexes 30, 32 on the projections 26, 28 against the upper surface 80 of the workpiece wall I. It is not critical that the apexes 30, 32 simultaneously abut the wall. Further advancement of the die 10 causes the projections 26, 28 to advance through the workpiece wall I so as to form two discrete, L-shaped openings 82, 84 in the workpiece wall I. As further advancement of the cutting die 10 occurs, the cutting edge 44 progressively severs the uncut portion 86 between the openings 82, 84. The cutting of portion 86 is simultaneously effected from both openings 82, 84 towards a midpoint. At the same time, the edges 40 sever the wall I away from the openings 82, 84 towards the wall III so as to define facing edges 88, 90. Once the portion 86 is severed, a flap 92 is defined.

Figures 1, 2:
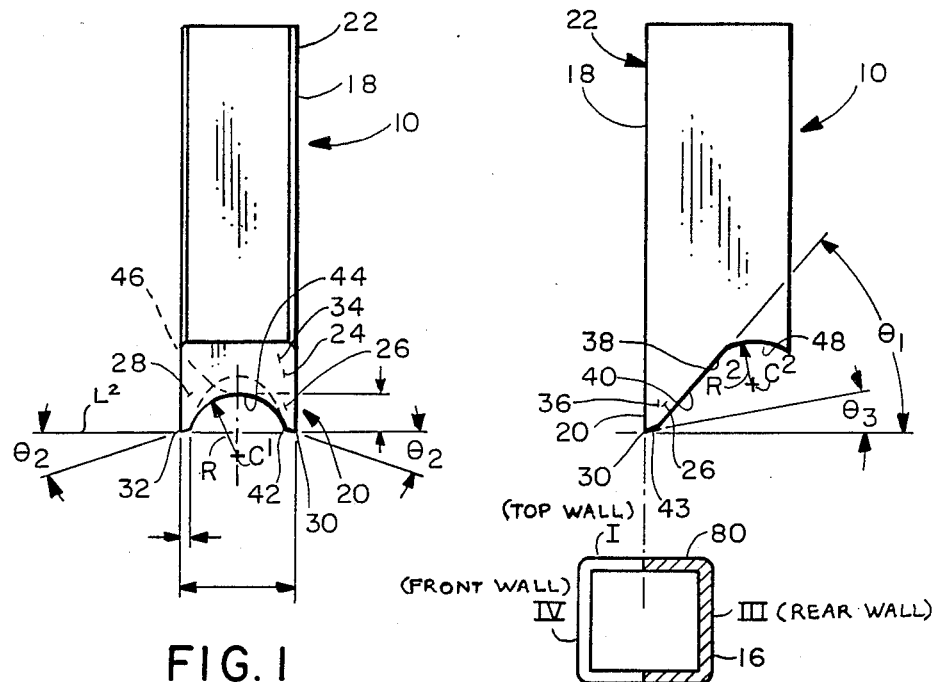
FIG. 1 is a front elevation view of a die for notching/cutting out hollow tubing, according to the present invention.
FIG. 2 is a side elevation view of the cutting die in FIG. 1 in relationship to a hollow workpiece.
Figures 3, 4:
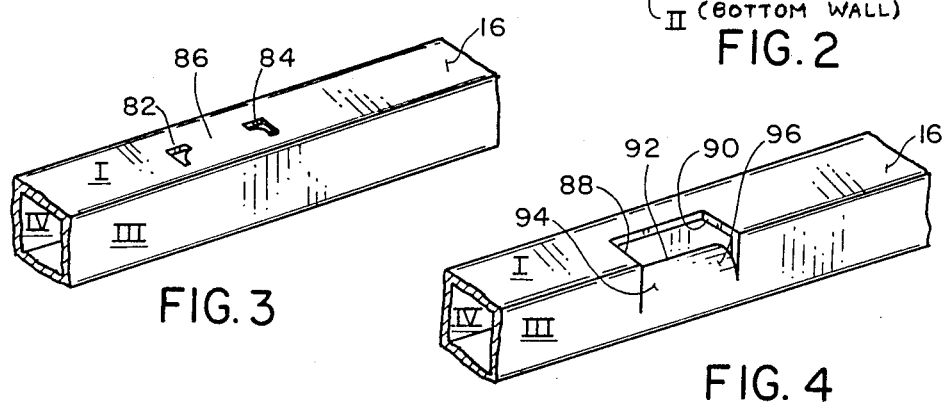
FIG. 3 is a perspective view of a length of hollow tubing which can be cut using the die in FIGS. 1 and 2.
FIG. 4 is a perspective view of the workpiece in FIG. 3 with a notch/cut-out partially formed therein using the die in FIGS. 1 and 2.

As the cutting die 10 advances, the wall 38 progressively curls the flap 92 away from the workpiece wall IV. The concave portion 46 of the wall 38 forms a crown at the top of the flap 92 so that the spaced edges 94, 96 on the flap 92 are folded inwardly towards each other. Upon further advance of the cutting die 10, the flap 92 is cut further downwardly out of the wall III, as shown in FIG. 4. Eventually, the apexes 30, 32 of the projections 26, 28 encounter the inside surface 97 of the bottom wall II of the workpiece 16. Two additional discrete openings (not shown) identical to the openings 82, 84, are defined in the wall II from the inside out. As the cutting die 10 advances, the wall II is cut out in the same manner as the wall I. With the cutting die fully advanced in the FIG. 9 position, the curled flap 92 encounters the concave wall 48 of the die 10, which separates the flap 92 from the remainder of the workpiece 16.

The result is a cleanly formed notch 14 in the workpiece 16. All corners of the notch 14 are sharply cut with minimal deformation of the workpiece 16.

The foregoing disclosure of specific embodiments is intended to be illustrative of the broad concepts comprehended by the invention.

I claim:

1. A die for advancement forcibly against the wall of a workpiece to make an incision therein, said die comprising:
   a body having a leading end and a trailing end; and
   a cutting blade on the leading end of the body, said cutting blade including:
      first and second spaced projection means for forming first and second discrete incisions in a workpiece wall upon the die being forcibly advanced against the workpiece wall to a first predetermined position relative to the workpiece;
      cutting edge means for severing a portion of the workpiece between the first and second discrete incisions to connect the first and second discrete incisions as the die is advanced beyond said first predetermined position relative to the workpiece;
      each projection having a flat wall with the flat walls on the first and second projections being substantially coplanar; and
      said flat walls on the projections cooperatively progressively deforming part of the workpiece wall that is cut by the die as the die is advanced.

2. The incision making die according to claim 1 wherein first cutting edge means are provided for severing the wall of the workpiece along a first line connecting one of the first and second discrete incisions and transverse to a line connecting the first and second discrete incisions as the die is advanced beyond said first predetermined position relative to the workpiece.

3. The incision making die according to claim 2 wherein second cutting edge means are provided for severing the wall of the workpiece along a second line connecting the other of the first and second discrete incisions and transverse to a line connecting the first and second discrete incisions as the die is advanced beyond said first predetermined position relative to the workpiece.

4. The incision making die according to claim 3 wherein said first and second lines are substantially parallel to each other.

5. The incision making die according to claim 1 wherein said first claimed cutting edge means comprises a U-shaped edge between said spaced projections and opening in a leading direction.

6. The incision making die according to claim 1 wherein each spaced projection has a leading end defined by two transverse cutting walls.

7. The incision making die according to claim 6 wherein each die is movable linearly to effect advancement thereof against a workpiece, each projection has an apex and a first straight edge extending away from the apex at a first predetermined acute angle with respect to the line of advancement of the die.

8. The incision making die according to claim 7 wherein each projection has a second straight edge extending away from its apex at a second predetermined acute angle with respect to the line of advancement of the die and the first and second straight edges at each apex make an acute angle with each other.

9. A die for advancement forcibly against the wall of a workpiece to make an incision therein, said die comprising:
   a body having a leading end and a trailing end; and
   a cutting blade on the leading end of the body, said cutting blade including:
      first and second spaced projection means for forming first and second discrete incisions in a workpiece wall upon the die being forcibly advanced against the workpiece wall to a first predetermined position relative to the workpiece; and
      cutting edge means for severing a portion of the workpiece between the first and second discrete incisions to connect the first and second discrete incisions as the die is advanced beyond said first predetermined position relative to the workpiece,
      wherein first cutting edge means are provided for severing the wall of the workpiece along a first line connecting one of the first and second discrete incisions and transverse to a line connecting the first and second discrete incisions as the die is advanced beyond said first predetermined position relative to the workpiece,
      wherein second cutting edge means are provided for severing the wall of the workpiece along a second line connecting the other of the first and second discrete incisions and transverse to a line connecting the first and second discrete incisions as the die is advanced beyond said first predetermined position relative to the workpiece,
      wherein means are provided on the die for progressively deforming a piece of a workpiece wall severed by the die transverse to a line connecting the first and second projections as the die is advanced into the wall of the workpiece.

10. The incision making die according to claim 9 wherein the die is movable linearly to effect advancement thereof, and the means for progressively deforming a piece of the workpiece wall comprises a wall on the die between the first and second cutting edge means, said wall making an acute angle with the line of advancement of the die.

11. The incision making die according to claim 10 wherein the angle between the die wall and line of advancement is approximately 30°–45°.

12. The incision making die according to claim 9 wherein said means for progressively deforming includes a concave surface on the die opening in a leading direction.

13. A die for advancement forcibly against the wall of a workpiece to make an incision therein, said die comprising:
   a body having a leading end and a trailing end; and
   a cutting blade on the leading end of the body, said cutting blade including:
      first and second spaced projection means for forming first and second discrete incisions in a workpiece wall upon the die being forcibly advanced against the workpiece wall to a first predetermined position relative to the workpiece; and
      cutting edge means for severing a portion of the workpiece between the first and second discrete incisions to connect the first and second discrete incisions as the die is advanced beyond said first predetermined position relative to the workpiece,
      wherein each spaced projection has a leading end defined by two transverse cutting walls,
      wherein the two transverse walls on each leading end make an angle of approximately 90° with each other.

14. A die for advancement forcibly against the wall of a workpiece to make an incision therein, said die comprising:
   a body having a leading end and a trailing end; and
   a cutting blade on the leading end of the body, said cutting blade including:
      first and second spaced projection means for forming first and second discrete incisions in a workpiece wall upon the die being forcibly advanced against the workpiece wall to a first predetermined position relative to the workpiece; and
      cutting edge means for severing a portion of the workpiece between the first and second discrete incisions to connect the first and second discrete incisions as the die is advanced beyond said first predetermined position relative to the workpiece,
      wherein each spaced projection has a leading end defined by two transverse cutting walls,
      wherein each die is movable linearly to effect advancement thereof against a workpiece, each projection has an apex and a first straight edge extending away from the apex at a first predetermined acute angle with respect to the line of advancement of the die,
      wherein said predetermined angle is approximately 10°-20°.

15. The incision making die according to claim 14 wherein a third straight edge projects angularly from the second straight edge on each projection in a common plane with the second straight edge and the common planes defined by the second and third edges at each projection are parallel.

16. A die for making an incision in the wall of a workpiece by advancing the die in a linear path against a workpiece, said die comprising:
   a body having a leading end and a trailing end;
   a cutting blade on the leading end of the body, said cutting blade including:
      a curved cutting edge defining first and second projections spaced from each other along a first line and each having an apex;
      a first cutting edge extending in a trailing direction away from the apex of one of the first and second projections and transverse to the first line; and
      a second cutting edge extending in a trailing direction away from the apex of the other of the first and second projections and transverse to the first line; and
      means between said first and second cutting edges for progressively deforming a flap severed from a tubing piece wall by the curved cutting edge, projections and first and second cutting edges as the cutting blade is advanced against a wall on a workpiece.

17. The incision making die according to claim 16 wherein the first and second cutting edges are straight.

18. The incision making die according to claim 17 wherein the first and second cutting edges are substantially parallel to each other.

19. The incision making die according to claim 18 wherein the first and second cutting edges each extend at right angles to a plane through the first line and extending parallel to the line of movement of the die.

20. The incision making die according to claim 18 wherein the common plane of the first and second cutting edges make an angle of approximately 45° with the line of advancement of the die.

21. A die for making an incision in a workpiece by advancing the die in a linear path against a workpiece, said die comprising:
   a body having a leading end and a trailing end; and
   a cutting blade on the leading end of the body, said cutting blade including:
      first and second spaced, wedge-shaped projections each having an apex at the leading end thereof; and
      a cutting edge extending between said spaced projections and spaced in a trailing direction from the apexes of the projections,
      each said wedge-shaped projection having a flat wall with the flat walls on the first and second projections being substantially coplanar,
      said flat walls on the projections cooperatively progressively camming a part of the workpiece cut by the die in the direction of movement of the die as the die is advanced.

22. The incision making die according to claim 21 wherein the cutting edge has a U-shaped configuration opening in a leading direction.

23. The incision making die according to claim 21 wherein each projection is defined by first and second transverse walls with edges thereon to produce an L-shaped cut as each projection is advanced into a workpiece.

24. The incision making die according to claim 21 wherein each projection has a first flat wall parallel to the line of advancement and said first claimed flat walls make an angle of approximately 45° with the last claimed flat wall.

25. The incision making die according to claim 21 wherein each projection tapers to a point at its apex.

26. The incision making die according to claim 21 wherein a concave surface opening in a leading direction is provided on each die to deform a part of a workpiece that is severed by the die in a predetermined fashion as the die is advanced.

27. A method of making an incision in a tubular workpiece having first and second facing wall pairs, said method comprising the steps of:
   providing a die having a cutting blade with a leading end and a trailing end, first and second spaced, wedge-shaped cutting projections each having an apex at the leading end thereof;

directing the die in a linear path against one of the walls in one of the facing wall pairs of the workpiece;

advancing the die to direct the projection on the die into the one wall to define two discrete incisions in the one wall;

further advancing the die to sever the one wall between the discrete incisions and thereby connect the discrete incisions;

further advancing the die to sever a flap out of the one wall;

further advancing the die to fold the flap away from one of the walls in the other wall pair;

further advancing the die to cause the die to cut the other wall on the other wall pair;

further advancing the die to cause the projections to make third and fourth discrete incisions in the other wall in the one wall pair;

further advancing the die to sever the other wall in the one wall pair between the third and fourth discrete incisions and thereby connect the third and fourth discrete incisions; and further advancing the die to separate the flap completely from the tubular workpiece.

* * * * *